United States Patent [19]

Taylor et al.

[11] Patent Number: 4,913,772
[45] Date of Patent: Apr. 3, 1990

[54] PORTABLE THERMOPLASTIC WELDING MACHINE

[75] Inventors: Philip A. Taylor, Columbus; A. Neil Johnson, Gahanna, both of Ohio

[73] Assignee: G.R. Systems, Inc., Columbus, Ohio

[21] Appl. No.: 176,666

[22] Filed: Apr. 1, 1988

[51] Int. Cl.⁴ .................. B32B 31/20; B32B 31/26; B32B 31/28

[52] U.S. Cl. .................................. 156/499; 156/545; 156/574; 156/577

[58] Field of Search ............... 156/391, 499, 545, 574, 156/577

[56] References Cited

U.S. PATENT DOCUMENTS

| | | | |
|---|---|---|---|
| 2,224,370 | 12/1940 | Wescott | 156/499 |
| 3,007,838 | 11/1961 | Eigenmann | 156/571 |
| 4,376,007 | 3/1983 | Eigenmann | 156/499 |
| 4,533,423 | 8/1985 | Johnson | 156/499 |
| 4,737,213 | 4/1988 | Paeglis | 156/499 |
| 4,761,201 | 8/1988 | Nichols | 156/499 |

FOREIGN PATENT DOCUMENTS 0048331 3/1985 Japan .................... 156/545

*Primary Examiner*—George F. Lesmes
*Assistant Examiner*—J. Davis
*Attorney, Agent, or Firm*—Frank H. Foster, Kremblas, Foster, & Millard

[57] ABSTRACT

This invention relates to portable machines for welding together individual thermoplastic sheets in situ. The machine heats different and opposing thermoplastic sheets using independently controlled electric, radiant heat sources and then compresses the sheets beneath an endless compression belt to complete the weld thus forming a unitary membrane.

4 Claims, 3 Drawing Sheets

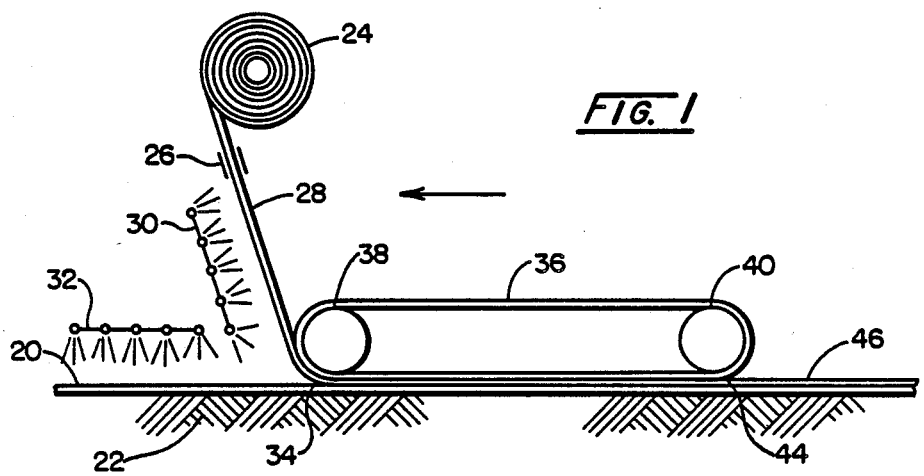
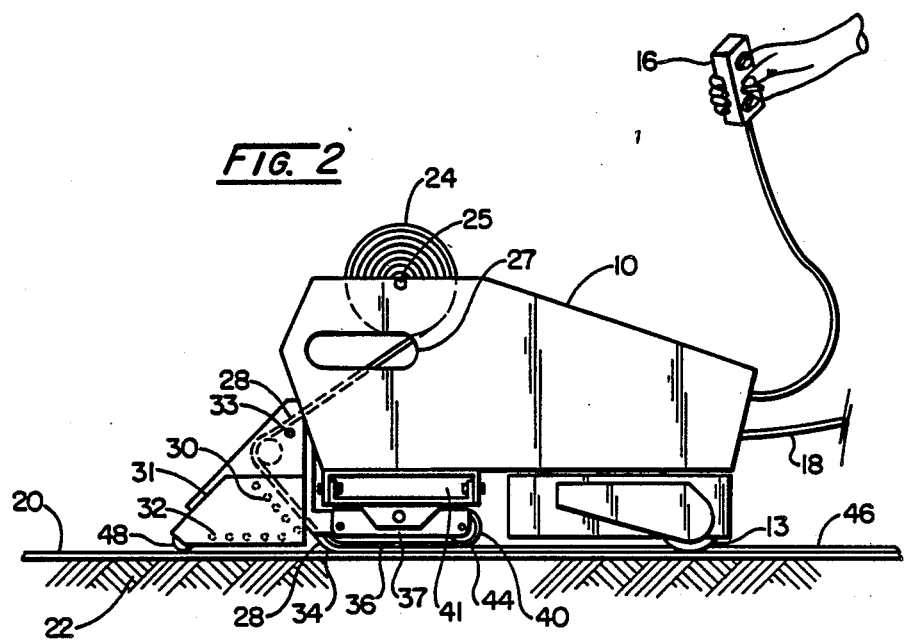
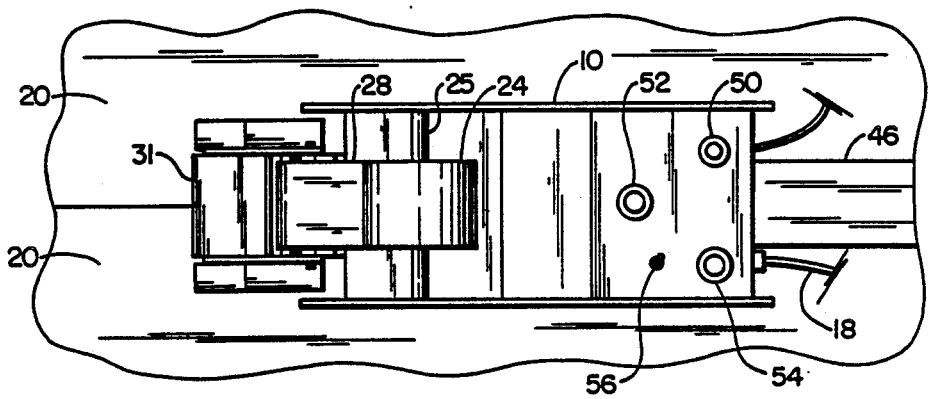

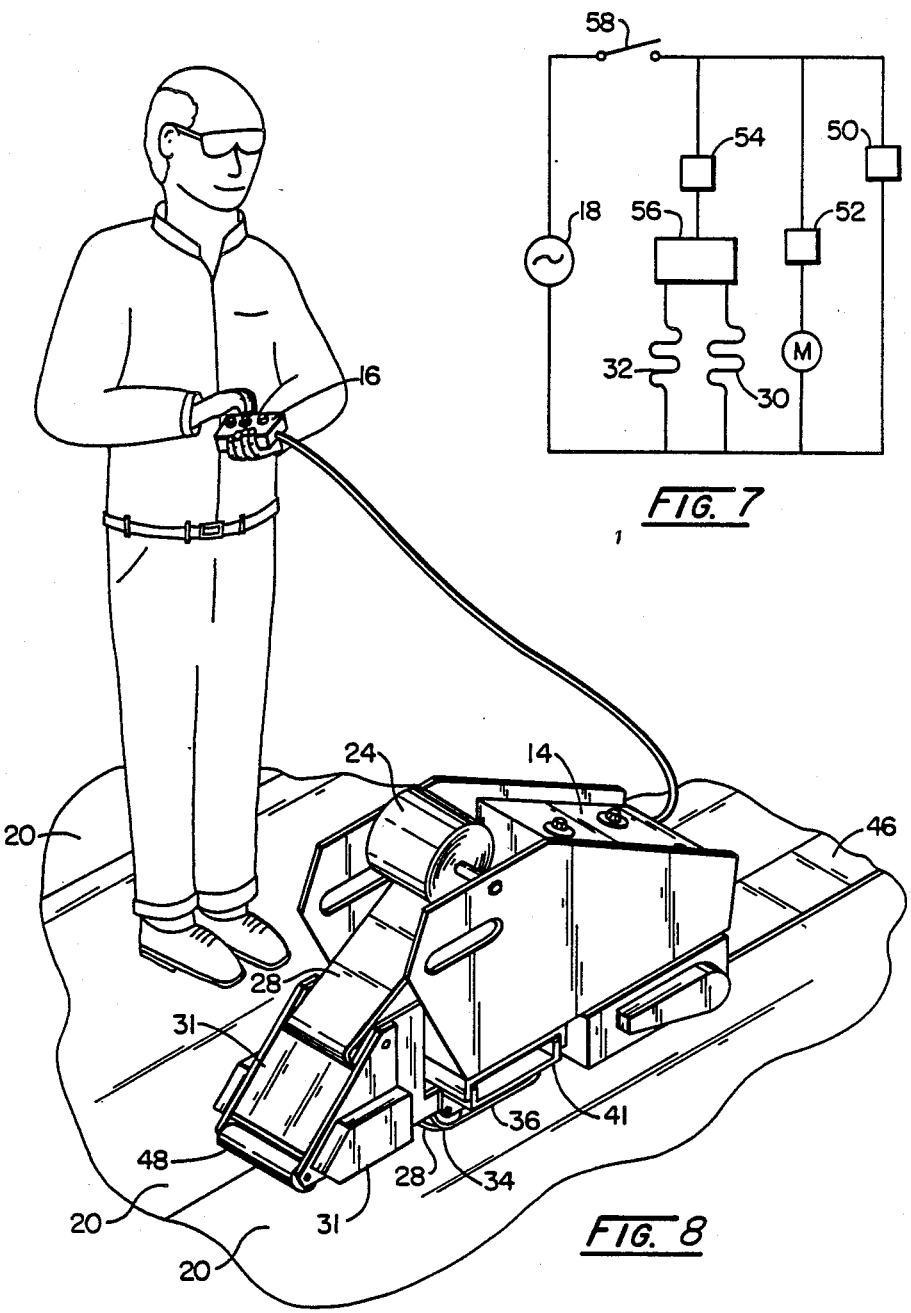

PORTABLE THERMOPLASTIC WELDING MACHINE

TECHNICAL FIELD

This invention relates to portable machines used for welding or fusing individual thermoplastic sheets and for repairing tears and ruptures in existing thermoplastic membranes. More particularly, it relates to a heating and welding system for such machines wherein a strip of thermoplastic sheeting is used as the material to join overlapping or abutting edges of individual thermoplastic sheets by heat and pressure.

BACKGROUND ART

The construction of large, impermeable, thermoplastic membranes is typically accomplished by transporting rolls of bulk thermoplastic materials to a work site. Individual sheets are unrolled, cut to length, and then positioned on a supporting structure so that the edges of the sheets may be welded or fused together in situ to form a singular unitary membrane. Such membranes are used as roof coverings, lagoon and reservoir liners, and also as large tarpaulins, among others.

The welding or fusing of the thermoplastic sheets, in the field, by means of portable welding machines is conventionally achieved by abutting or overlapping the edges of the individual sheets. Heat is applied to the edges until they have changed from a solid to a tacky viscous fluid state. The heated portions are then compressed together while they are hot so that the sheets, upon cooling, become a single unitary membrane consisting of a multiple of fused sheets.

The welding together of individual sheets in situ is accomplished in the prior art in one of two ways. The first is where the sheets are initially laid out with their edges overlapping. In that case an upper and a lower sheet, referred to as opposing sheets, are separated and a heat source is interposed between them. The heat source heats a bottom portion of the upper sheet along its edge, and a top portion of the lower sheet along its edge. The two heated portions are then compressed together while they are hot to form a welded membrane. For the other way, the individual sheets, referred to as primary sheets, are laid out with either abutting or overlapping edges and the sheets are fused by welding a strip or tape of thermoplastic material along the butt or overlap, forming a seam. In that case, three individual sheets are involved, the two primary sheets and a strip or tape. The strip or tape is fused equally to both primary sheets.

Conventionally, the tape or strip is applied from the top and placed onto the two primary sheets below which are lying on the supporting structure. In that case, the tape or strip is the upper sheet. The heat source is interposed between the tape or strip and the primary sheets below. The bottom of the tape or strip is heated along with the top of the edges of the primary sheets. The strip is the opposing sheet relative to the primary sheets. The weld is completed following the compression of the heated portions into a unitary membrane. In either case, a heat source is interposed between an upper and a lower sheet or sheets and the primary or opposing sheets are heated in preparation for the compression. The upper and lower sheet or sheets are hereinafter referred to as opposing sheets for all cases. In the latter type of cases, tape or strip is hereinafter referred to as strip.

Machines of the referenced type are generally motor driven, self-propelled machines in which a drive motor is connected through a drive train to one or more drive wheels. A heating means, commonly a hot-air blower, and a sheet handling means are provided on the machine for guiding at least one of the opposing sheets through the machine and past the heating means as the machine travels along. The edges of the opposing sheets are heated and then laid or placed together while hot. The laminate of hot sheets then passes through a compression means and out of the machine as the weld is completed automatically.

In conventional portable welding machines, a single heat or temperature source heating means heats the opposing sheets until a fluid or semi-solid state has been achieved to allow for the compression and fusion of the sheets. When using a single heat means which operates at a constant temperature a problem is presented when different thermoplastic sheet materials are to be fused. A similar problem is presented when the same or different thermoplastic sheet materials are to be fused but the sheets are of different thicknesses.

Thermoplastic sheet materials have a range of thermal properties. For example, a typical molding temperature for plasticized vinyl begins at 285° F. and that for polypropylene typically begins at 350° F. It is often desirable to fuse two such different materials, particularly when called upon to repair a tear or rupture in an existing membrane.

The quantity of heat required to fuse thermoplastic materials varies with the thicknesses of the sheets to be fused. It is often desirable to fuse sheets of different thicknesses, particularly when using a strip to fuse two primary sheets. When fusing sheets of different thicknesses, the different thermal requirements of each of the opposing sheets lead to different temperature or heat means differential output requirements for each of opposing sheets. The differential requirements are compounded when the sheets are of both different thermoplastic materials and different thicknesses.

A similar heat differential problem exists when similar or different individual sheets have been exposed to different ambient environments prior to the time when welding begins. This situation typically occurs when the individual sheets, which are to become a roofing membrane, are laid out in the sunlight and reach high temperatures due to natural solar radiation and the welding is started by using a strip of material previously stored in a sheltered location and thus is at ambient air temperatures.

Conventionally, an operator uses a single heat source operating at a single temperature until the opposing sheets are somewhat fluidized. In other words the different thermal requirements of the opposing sheets are generally disregarded in conventional systems. The result of this technique, typically achieved by single temperature hot-wedge or hot-plate machines, is often a faulty weld caused by the over curing or hardening of the sheet with the lower thermal requirements. Since a hardened membrane cracks and fails, this result is undesirable. A similar result is achieved by single heat source hot air machines where the operator either manually distributes the heat between the opposing sheets using intuition, experience, or skill, or applies heat generally as is done with the hot-wedge machines.

The aforementioned temperature and heat differential problems are solved by the present invention. The present invention is limited to electric radiant heat sources in order to overcome other environmental problems typically encountered in the field when using portable hot air machines. The hot air machine, while amendable to a dual heat source welder, is too sensitive to outdoor wind conditions to be a practical solution to the aforementioned problems. The natural wind often blows away the hot air leading to ineffective or spotty heating and welds.

A second problem is presented when the opposing heated sheets are compressed together with conventional portable welding machines. Following the heating of the sheets with a conventional machine, the sheets are fused, by a compression means, into a unitary membrane. The conventional compression means consists of a single roller or wheel and thus the sheets are compressed once and essentially instantaneously as the machine travels on. The region of compression action is in the shape of a line transverse to the major axis of the weld and beneath the roller. That line region then travels along the seam automatically at the linear velocity of the machine.

The conventional compressing technique creates problems. Impurities, particularly bubbles, which are trapped between the sheets prior to the compression, have a tendency to be distributed along the seam or are trapped within the weld without lateral expulsion or dissolution. This creates undesirable welds containing impurities. The problem is compounded when combined with the aforementioned thermal differential requirements. In cases where a bubble is trapped in the weld and the upper opposing sheet has been overheated, the bubble forms a hardened dome, a burned-bubble, which is easily fractured.

There is therefore a need for a portable machine that provides compression of the hot sheets for an extended period of time to decrease the incidence of impurity entrapment in the weld, particularly with respect to bubbles. This problem is solved by the present invention.

BRIEF DISCLOSURE OF INVENTION

In accordance with the above objects for the improvement of thermoplastic sheet weld quality, substantial improvements can be made by providing heating means comprising two independent, proportionally controlled electric radiant heat sources. When embodied within a portable machine and interposed between the opposing sheets, each radiant heat source is dedicated to, directed at, and adjusted for the thermal requirements of one of the opposing sheets. By using different radiant heat source output temperatures to achieve the different melting points of each of the opposing sheets, at essentially the same time, each sheet can be correctly and consistently melted to allow for a complete and uniform fusion along the weld.

The advantages of the present invention result from the elimination of the aforementioned prior art thermal differential requirement problems. Those problems are solved by controlling the temperature and the amount of heat that each opposing sheet is exposed to.

With the present invention, when one of the opposing sheets requires more or less heat than the other, the heat source output dedicated to that sheet is increased or decreased accordingly. As a result, higher quality and more consistent welds are achieved. Reduced installation costs also result because fewer sheets are destructively burned when being welded to different opposing sheets that have higher thermal requirements. Additionally, greater flexibility of use is a result of the invention due to the choice of thermoplastic materials for use in repairing and splicing thermoplastic sheets now available. For example, low melting point strips may be used to repair tears and ruptures in existing high melting point membranes without seeking out the manufacturer of the membrane in order to match the thermal properties of the materials.

Substantial improvements are also made, in accordance with the above objects, by providing compression means which distribute the compressive forces over a plane, rather than in a line, and for a greater duration of time, rather than relatively instantaneously. By providing an endless belt and by providing for an increased time of compression, impurities found in the fluids have time to move laterally and be expelled from the weld or to be dissolved or compressed before the materials cool and return to a relatively solid state. As a result, the incidence of large bubble entrapment is reduced and thus, a higher quality weld is produced.

BRIEF DESCRIPTION OF DRAWINGS

FIG. 1 is a diagrammatic side view showing the structural relationship of the primary components comprising the instant invention to the materials and process affected thereby.

FIG. 2 is a view in side elevation showing the preferred embodiment of FIG. 1.

FIG. 3 is a view in top elevation showing the preferred embodiment of FIG. 1.

FIG. 7 is an electrical diagram showing the control means relationships of the primary components comprising the preferred embodiment.

FIG. 8 is a view of the preferred embodiment in use.

Figure 4:
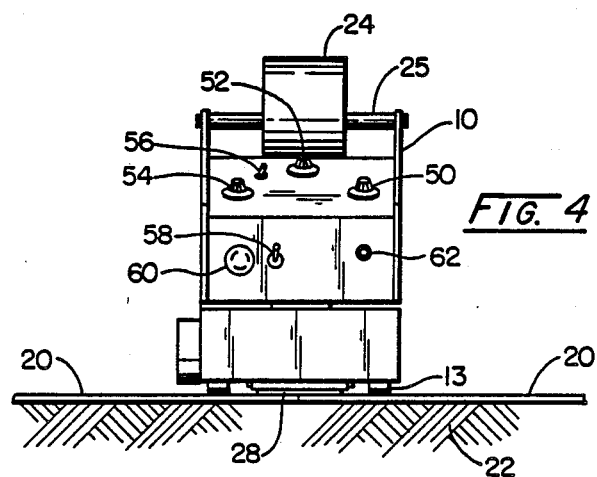
FIG. 4 is a view in rear elevation showing the preferred embodiment of FIG. 1 with the direction of travel being away from the viewer.

In describing the preferred embodiment of the invention, which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other elements where such connection is recognized as being equivalent by those skilled in the art.

DETAILED DESCRIPTION

Referring to FIG. 1, there is shown a diagrammatic side view representing the structural relationships of the primary components comprising this invention. With reference also to FIG. 8, the perspective, the assembly of the membrane is commenced by laying out, in situ, individual thermoplastic sheets 20 on a supporting structure 22, such as a structural roof deck. The layout may be by either abutting or overlapping the edges of the individual sheets since the object is to fuse multiple individual sheets to form a larger unitary membrane 46.

The machine is initially positioned over the edges of two of the individual sheets 20, if they are abutted, or the uppermost edge if the sheets are overlapped. A roll of thermoplastic weld material 24, centered within the machine, is centered over the edges. A strip 28 from the roll 24 is fed through and laterally held in position by a strip guide 26.

The strip 28 is guided past a first electric radiant heat source 30 where the bottom side of the strip 28 is exposed to heat and radiant energy. The strip 28 travels past the heat source 30 at the forward velocity of the machine while tension in the strip 28 causes new unexposed material from the roll 24 to be drawn into position for heating. As the machine moves in a forward direction 12 at a uniform velocity, the strip 28 is heated at a uniform rate. The length of strip 28 that is heated is equal to the distance that the machine travels over any given time span. After the strip 28 is exposed to the first radiant heat source 30, the strip 28 is pulled unguided into contact with the lower opposing sheets 20. A line of contact 34 is made while the strip 28 is still hot.

Simultaneously with the heating of the strip 28, the fixed lower sheets 20 are exposed to a second electric, radiant heat source 32. The lower radiant electric heat source 32 travels above the lower sheets 20 at a uniform velocity equal to the forward velocity of the machine because it is attached to the machine. The length of materials that are heated is always equal to the distance that the machine travels over any given time span.

As the machine moves forward and heats the top of the lower sheets 20, the strip 28 is drawn down upon the lower sheets 20 while all of the sheets 20 and 28 are still hot. They meet at a forward moving line of initial contact 34.

The upper radiant heat source 30 is dedicated to the heating of the bottom of the strip 28. The lower radiant heat source 32 is dedicated to the heating of the tops of lower sheets 20. The outputs of heat sources 30 and 32 are adjusted proportionately by proportionate control means 14 as means to affect the independent dedication. With both radiant heat sources 30 and 32 mounted within a single housing 31, said sources are interposed between the sheets 20 and the strip 28.

A compression belt 36 compresses the sheets together while they are still hot. The belt 36 travels around a pair of rollers 38 and 40 and relative to the initial line of contact 34. The belt 36 rolls over the line of contact 34 and fuses the sheets 20 and 28 together by gravity driven compression. The compression is applied over the length of the belt 36. The welding process is completed as the machine travels over a completion line 44, the end of the welding process. A welded sheet 46, a unitary membrane, is thus produced.

The initial radiant energy output level of each independent heat source 30 or 32 may be established by reference to data, operator experience, or iteration based on observation and testing. For example, by directly observing the heated strip 28 just prior to the initial line of contact 34, or by touching it with a small probe, the operator can decide whether the bottom of the strip 28 is tacky or behaves more like a semisolid than a solid. If it is not tacky or if it behaves like a solid, the output of the upper heat source 30 is increased by proportional control means 14. The process is then repeated for the top of the lower sheets 20 with the lower heat source 32. This initialization process is repeated until an optimum output of each of the heat sources 30 and 32 has been established. An experienced welder may make the aforementioned adjustments by observing and testing the completed weld; if not sheets are burned or hardened and the weld depth is approximately the thickness of the sheets, the outputs are correctly set.

Figure 5:
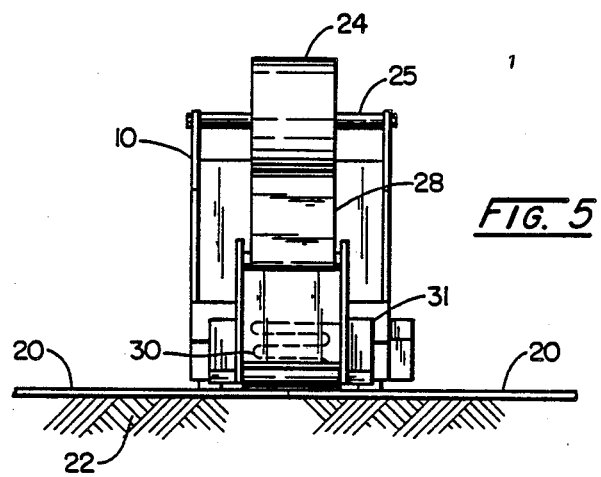
FIG. 5 is a view in front elevation showing the preferred embodiment of FIG. 1.
Figure 6:
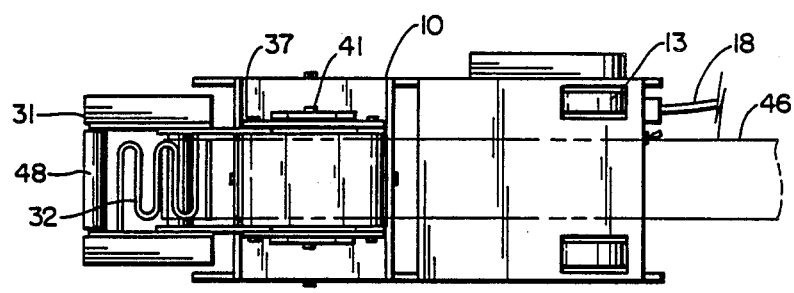
FIG. 6 is a view in bottom elevation of the preferred embodiment of FIG. 1.

Referring to FIGS. 2 through 6, the preferred embodiment of the portable, thermoplastic sheet, welding machine has a protective housing 10 which contains the electric control and power circuitry and drive motor and drive means connected to drive wheels 13. The electric control means 14 are mounted on a detachable panel 15 on the face of the housing 10 for access. It is inclined for visibility. A hand-held electric remote control means 16 is connected to the panel 15. An enabling power source 18 is interconnected therein.

A roll of thermoplastic strip 24 provides a supply of welding material. The roll 24 spins freely within the housing 10 and is supported on the housing walls by a horizontal shaft 25. The roll 24 is centered relative to the strip guide 26. Hand slots 27 are cut from the housing walls for manually transporting and positioning the machine. A carrying handle is located approximately above the center of gravity of the machine.

An upper, independent, electric radiant heat source 30 is attached within a heater housing 31 in a near vertical orientation. A lower independent radiant heat source 32 is also attached within the housing 31, but in a near horizontal orientation. The heater housing 31 is closed on four sides and open on the bottom and back sides for the application of the heat to the thermoplastic sheets 20 and 28. The bottom opening is dedicated to the lower heat source 32 and the back opening is dedicated to the upper heat source 30. The lower heat source 32 heats the top of the lower sheets 20; the upper heat source 30 heats the bottom of the strip 28. Because both heat sources 32 and 30 are attached within a single heater housing 31, and the heater housing 31 is located for the heating of the opposing faces of the opposing sheets 20 and 28, the heat sources 30 and 32 are interposed between opposing sheets. The heater housing 31 is attached to the housing 10 by hinge means 33. The heater housing 31 contains a roller 48 or a skid on its leading edge to rotate the housing 31 around the hinge means 33 when contour of the underlayment changes. The roller 48 and the hinge means 33 keep the lower heat source 32 a fixed distance from the lower sheets 20 when traversing surfaces with changing contours.

An endless compression belt 36 is contained in a detachable belt housing 37 for access and maintenance. The belt housing 37 is connected to housing 10 by a gimbal means 41 to provide uniform compression across the compression plane. The endless belt 36 rotates around a pair of rollers 38 and 40. The rollers 38 and 40 are free-wheeling and attached to the inside walls of the belt housing 37. A pair of drive wheels 13 are contained in a separate detachable wheel housing. The wheel housing is connected to the housing 10 and contains drive means and means for the rotation of the wheel housing for steering.

Referring particularly to FIG. 8, the preferred embodiment is shown in perspective in operating position. Subsequent to the set-up, the operator stands to the side and steers the machine while the weld is completed automatically. Under fluctuating environmental conditions, the independent radiant heat sources 30 and 32 may be further adjusted by control means 14 according to the aforementioned procedures. Remote control means 16 are used to steer the machine and to control its forward speed.

Referring to FIG. 7 and FIG. 3, the aforementioned electric control means 14 are more particularly described as follows. An enabling power source 18 is connected thereto. A master switch 58 enables the circuitry. A drive motor speed controller means 52 controls the forward speed of the machine. Right and left tracking is controlled by controller means 50. The total heat output of both radiant heat sources is controlled at controller means 54 and that energy is divided between the two sources proportionally by proportional control means 56, in whatever proportion is required as determined by the differential heat requirements of the opposing sheets. Controller means 54 is, in one embodiment, a conventional triac power control circuit which controls the power by controlling the duty cycle or the conduction angle. Proportion control 56 is, in one embodiment, two such conventional power control circuits having inversely proportional duty cycles or conduction angles. Other conventional circuits which are obvious to those of ordinary skill in the electronic and electrical control arts are also contemplated by the invention.

While certain embodiments of the present invention have been disclosed in detail, it is to be understood that various modifications may be adopted without departing from the spirit of the invention or scope of the following claims.

We claim:

1. In an improved portable thermoplastic sheet welding machine in which opposing thermoplastic sheets, an upper strip and lower sheets, are welding together to make a unitary membrane, the machine having heat source means to heat the opposing thermoplastic sheets and compression means to compress the heated portions into a weld, an improved heat source means wherein the improvement comprises:
   (a) a first, radiant, electric heat source directed at the thermoplastic surface of an upper strip of thermoplastic sheet and substantially dedicated to that material;
   (b) a second, radiant, electric heat source directed at the opposing sheets and substantially dedicated to that material; and
   (c) electric control means for independently controlling the temperatures of the first and second radiant heat sources to permit them to operate at different temperatures.

2. The combination according to claim 1 where the radiant, electric heat sources are interposed between the strip and the opposing sheets with hinge means of attachment to the machine housing.

3. The combination according to claim 2 and further including sheet compression means comprising an endless belt rotating around free wheeling rollers with a gimbal means of attachment onto the machine housing.

4. The combination according to claim 1 and further including sheet compression means comprising an endless belt rotating around free wheeling rollers with a gimbal means of attachment onto the machine housing.

* * * * *